US011993621B1

(12) United States Patent
Even

(10) Patent No.: US 11,993,621 B1
(45) Date of Patent: May 28, 2024

(54) CONTINUOUS FLOW PROCESS FOR SILOXANE SYNTHESIS

(71) Applicant: Honeywell Federal Manufacturing & Technologies, LLC, Kansas City, MO (US)

(72) Inventor: Dakota Even, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 40 days.

(21) Appl. No.: 18/312,585

(22) Filed: May 4, 2023

(51) Int. Cl.
*C08G 77/06* (2006.01)
*B01J 19/00* (2006.01)
*B01J 19/24* (2006.01)
*C07F 7/21* (2006.01)

(52) U.S. Cl.
CPC ............. *C07F 7/21* (2013.01); *B01J 19/0013* (2013.01); *B01J 19/245* (2013.01); *B01J 2219/00033* (2013.01); *B01J 2219/00063* (2013.01); *B01J 2219/00162* (2013.01); *B01J 2219/00164* (2013.01); *B01J 2219/00231* (2013.01); *C08G 77/06* (2013.01)

(58) Field of Classification Search
CPC .................................. C08G 77/06; C07F 7/21
USPC .................................................. 556/460, 461
See application file for complete search history.

(56) References Cited

U.S. PATENT DOCUMENTS 3,110,720 A * 11/1963 Pike ......................... H01B 3/46 252/78.3
3,842,110 A * 10/1974 Razzano ................ C08G 77/04 528/37
4,079,070 A * 3/1978 Maass ....................... C07F 7/21 528/37
4,423,240 A * 12/1983 Yeboah ................. C07F 7/0874 556/460
4,578,494 A * 3/1986 Marko .................. C07F 7/0874 556/460
5,739,370 A * 4/1998 Razzano ............... C07F 7/0874 556/461
2020/0316552 A1* 10/2020 Lim ..................... B01J 19/0033

* cited by examiner

*Primary Examiner* — Margaret G Moore
(74) *Attorney, Agent, or Firm* — Erise IP, P.A.

(57) ABSTRACT

Methods, systems, and computer-readable media for providing a continuous flow synthesis process including two or more multiphase reactions for producing a diphenyl siloxane product. Reactants and supporting substances are continuously added in-line of the continuous flow path to eliminate downtime associated with batch processes and increase the overall yield of the synthesis over time.

20 Claims, 4 Drawing Sheets

300
302
Cl
Si
Cl
304
306
Si
OH
OH
308
310
Si
O

CONTINUOUS FLOW PROCESS FOR SILOXANE SYNTHESIS

STATEMENT OF GOVERNMENT SUPPORT

This invention was made with government support under contract number DE-NA-0002839 awarded by the United States Department of Energy/National Nuclear Security Administration. The government has certain rights in the invention.

BACKGROUND

1. Field

Embodiments of the invention relate to chemical synthesis. More specifically, embodiments of the invention relate to chemical synthesis of siloxane substances.

2. Related Art

In existing siloxane synthesis systems for solid materials, such as octaphenylcyclotetrasiloxane, a batch process is typically used, which is not continuous. Accordingly, a first chemical A is received into a first batch reactor to produce a second chemical B, as shown. The chemical B is isolated and further processed before adding the isolated chemical B along with a methanol substance into a second batch reactor. The ratio of methanol substance to chemical B is typically 3:1 by weight for the prior art synthesis system such that a large amount of methanol is used to suspend the solid chemical B within the methanol. Product chemical C is produced from the second batch reactor.

A number of issues have been identified within the prior art batch process described above. The batch process is typically slow and associated with large amounts of downtime. For example, the batch reactors (the first batch reactor and the second batch reactor) have to be cleaned after each use. Further, chemical B is typically isolated after removal from the first batch reactor, which increases processing time. Further still, the amount of methanol used in the second batch reactor is large and thus, expensive.

SUMMARY

Embodiments of the invention solve the above-mentioned problems by providing a continuous siloxane synthesis process.

In some aspects, the techniques described herein relate to a method of synthesis of diphenyl cyclic siloxanes within a continuous flow system, the method including: mixing a chlorosilane substance and a solvent to form a chlorosilane-solvent mixture; providing, into a first reactor of the continuous flow system, the chlorosilane-solvent mixture and an acid scavenger substance; reacting, in the first reactor of the continuous flow system, the chlorosilane-solvent mixture and an acid scavenger substance to form a first reaction product; providing, into a separator, the first reaction product to remove one or more waste products from the first reaction product; providing, into a second reactor of the continuous flow system, the first reaction product and a methanol substance; and reacting, in the second reactor of the continuous flow system, the first reaction product and the methanol substance to form a diphenyl cyclic siloxane product.

In some aspects, the techniques described herein relate to a method, wherein the methanol substance includes a caustic methanol.

In some aspects, the techniques described herein relate to a method, wherein the solvent includes a polar aprotic organic solvent.

In some aspects, the techniques described herein relate to a method, wherein the first reactor includes a plug flow reactor and the second reactor includes a continuous stirred tank reactor.

In some aspects, the techniques described herein relate to a method, further including: receiving a signal from a sensor disposed within a flow path of the continuous flow system, the signal indicative of one or more measured parameters associated with the continuous flow system detected by the sensor; and adjusting operation of one or more pumps of the continuous flow system based on the signal from the sensor.

In some aspects, the techniques described herein relate to a method, wherein the chlorosilane substance includes a diphenyldichlorosilane substance and the diphenyl cyclic siloxane product includes an octaphenylcyclotetra siloxane substance.

In some aspects, the techniques described herein relate to a method, further including: maintaining, using at least one heating device, a temperature within the continuous flow system between 32 and 37 degrees Celsius.

In some aspects, the techniques described herein relate to a method, further including: maintaining, using one or more pumps of the continuous flow system, a flowrate of the chlorosilane substance at between 0.3 and 0.5 milliliters per minute over a period of time.

In some aspects, the techniques described herein relate to a continuous flow system including: a first reactor; a separator; a second reactor; and a control system that executes a method including: mixing a chlorosilane substance and a solvent to form a chlorosilane-solvent mixture; providing, into the first reactor of the continuous flow system, the chlorosilane-solvent mixture and an acid scavenger substance; reacting, in the first reactor of the continuous flow system, the chlorosilane-solvent mixture and an acid scavenger substance to form a first reaction product; providing, into the separator, the first reaction product to remove one or more waste products from the first reaction product; providing, into the second reactor of the continuous flow system, the first reaction product and a methanol substance; and reacting, in the second reactor of the continuous flow system, the first reaction product and the methanol substance to form a diphenyl cyclic siloxane product.

In some aspects, the techniques described herein relate to a continuous flow system, further including: one or more pumps communicatively coupled to the control system.

In some aspects, the techniques described herein relate to a continuous flow system, further including: one or more temperature sensors disposed within a fluid path of the continuous flow system that measure at least one temperature within the continuous flow system; one or more pressure sensors disposed within a fluid path of the continuous flow system that measure at least one pressure within the continuous flow system; and one or more flow sensors disposed within a fluid path of the continuous flow system that measure at least one flow rate within the continuous flow system.

In some aspects, the techniques described herein relate to a continuous flow system, further including: a controller of the control system that receives a signal including information indicative of at least one of the at least one temperature, the at least one pressure, and the at least one flow rate, wherein the controller adjusts operation of the one or more pumps based at least in part on the signal.

In some aspects, the techniques described herein relate to a continuous flow system, further including: at least one heating device disposed within a fluid path of the continuous flow system that provides heating to the continuous flow system.

In some aspects, the techniques described herein relate to a continuous flow system, wherein the at least one heating device maintains a temperature within the continuous flow system between 32 and 37 degrees Celsius.

In some aspects, the techniques described herein relate to a continuous flow system, wherein the separator includes a membrane separation system.

In some aspects, the techniques described herein relate to a method of synthesis of diphenyl cyclic siloxanes within a continuous flow system, the method including: mixing a diphenyldichlorosilane substance and a solvent to form a chlorosilane-solvent mixture; providing, into a first reactor of the continuous flow system, the chlorosilane-solvent mixture and an acid scavenger substance; reacting, in the first reactor of the continuous flow system, the chlorosilane-solvent mixture and an acid scavenger substance to form a first reaction product; providing, into a separator, the first reaction product to remove one or more waste products from the first reaction product; providing, into a second reactor of the continuous flow system, the first reaction product and a methanol substance; and reacting, in the second reactor of the continuous flow system, the first reaction product and the methanol substance to form an octaphenylcyclotetra siloxane product.

In some aspects, the techniques described herein relate to a method, wherein a flow rate of the diphenyldichlorosilane substance is selected to prevent precipitation of solids within the continuous flow system.

In some aspects, the techniques described herein relate to a method, further including: condensing the octaphenylcyclotetra siloxane product at room temperature.

In some aspects, the techniques described herein relate to a method, further including: while the octaphenylcyclotetra siloxane product is condensed at room temperature, agitating the octaphenylcyclotetra siloxane product using a stir bar.

In some aspects, the techniques described herein relate to a method, further including: after condensing the octaphenylcyclotetra siloxane product, filtering a solid precipitate from a liquid portion of the octaphenylcyclotetra siloxane product; and washing the solid precipitate using a methanol water mixture.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
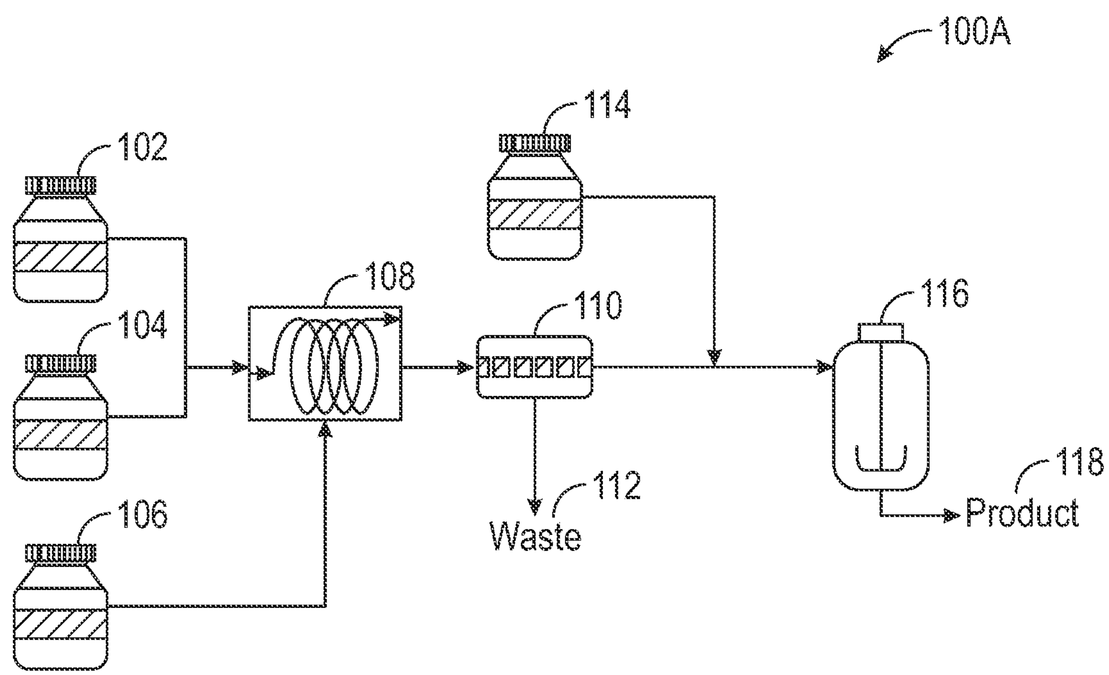
FIG. 1A illustrates an exemplary continuous siloxane synthesis system relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments of the present disclosure contemplate a continuous flow siloxane synthesis process in which a first reaction product is not isolated prior to a second reaction. Additionally, embodiments are contemplated in which a substantially lower amount of methanol is used compared to existing batch synthesis processes to prevent phase separation. Further, the methanol is added in-line within the continuous flow path of the first reaction product. In prior synthesis systems, 3 parts methanol were included for every one part of chemical B. However, embodiments of the present disclosure contemplate using generally equal amounts of methanol compared to the first reaction product. Accordingly, about 66% less methanol may be used within the continuous synthesis system described herein.

In some embodiments, the continuous flow siloxane synthesis process is applied within a microreactor system. However, other embodiments are contemplated that include scaling the process up into larger systems. The continuous flow substantially reduces cleaning time, interchange time, and overall reaction time as compared to existing batch synthesis techniques in which cleaning is carried out between each subsequent batch. In some embodiments, the continuous throughput of the continuous synthesis process described herein greatly increases the overall product yield over time of the product as the process continuously operates over extended periods of time. Further, the elimination of cleaning time associated with a batch process greatly reduces time in which no product is produced and allows the system to continue synthesis operation without significant downtime. Further still, the continuous flow provides more control over the reactions through selectively adjusting residence times such that byproducts are reduced or eliminated.

FIG. 1A illustrates an exemplary continuous siloxane synthesis system 100A relating to some embodiments. In such embodiments, a diphenyldichlorosilane substance 102 (or other chlorosilane substance) referred to herein as chemical A, a solvent 104, and an acid scavenger substance 106 are received into a first reactor 108. The solvent 104 may include an organic polar aprotic solvent and, in some embodiments, is anhydrous comprising any of acetone, methyl ethyl ketone, or Tetrahydrofuran (THF), and is added in-line upstream of the first reactor 108 to form a chlorosilane-solvent mixture. The solvent 104 may be selected and added to improve process yield of the overall synthesis process. Additionally, the acid scavenger substance 106 may include an aqueous acid scavenger, such as amine (ammonium hydroxide, triethyl amine) or salt (sodium hydroxide) to remove hydrochloric acid byproduct. In some embodiments, the first reactor 108 comprises a plug flow reactor to facilitate continuous flow within the siloxane synthesis system 100A.

The first reactor 108 reacts the diphenyldichlorosilane substance 102, the solvent 104, and the acid scavenger substance 106 to form a first reaction product. In some embodiments, the first reaction product comprises diphenylsilanediol (DPSD) referred to herein as chemical B. An organic liquid consisting of solvent and DPSD in the form of droplets dispersed in neutral aqueous saltwater exits the outlet of the first reactor 108. In some such embodiments, the first reactor 108 produces a two-phase solution comprising an oil phase (including the DPSD) and an aqueous phase (including the saltwater). Accordingly, the first reaction product may be provided to a separator 110 that separates one or more waste products 112 from the first reaction product. In some embodiments, the separator 110 comprises a membrane separation unit configured to separate an organic phase and an aqueous phase. As such, the separator 110 may comprise a liquid-liquid separation unit that is configured to remove the aqueous phase as saline waste from the oil phase.

The separated first reaction product comprising the oil phase and a methanol substance 114 are provided a second reactor 116. In some embodiments, the methanol substance 114 comprises a caustic methanol such as sodium hydroxide (NaOH) in methanol. The methanol substance 114 is utilized as a phase stabilizer to stabilize a phase of the first reaction product and prevent phase separation. Accordingly, the methanol substance 114 prevents water from dropping out from an oil phase in the first reaction product by absorbing water. The introduction of the methanol substance increases the overall purity of the final product. Otherwise, without the introduction of the methanol substance, a catalyst substance may crystallize and precipitate out of the first reaction product greatly decreasing the overall product purity.

In some embodiments, the methanol is mixed with the oil phase to form a suspended solution and promote condensation of the DPSD into the desired product substance and to stabilize dissolution of a condensation catalyst. The second reactor 116 is configured to react the first reaction product with the methanol substance 114 to form a second reaction product 118, such as, diphenyl cyclic siloxane. In some embodiments, the second reactor 116 comprises a condensation reactor or a continuous stirred tank reactor (CSTR) such that the final product substance precipitates out of the solution in solid form. In some embodiments, a final siloxane product is produced having a purity of 99% or higher.

It should be understood that, in some embodiments, the amount of methanol substance 114 added is substantially less than what is used in existing batch reactor systems. As described above, typical batch processes use about a 3:1 ratio by weight of methanol to chemical B. Conversely, embodiments of the invention contemplate using about a 1:1 ratio by weight of the methanol substance 114 to the first reaction product. A substantially lower amount of the methanol substance 114 may be suitable because the first reaction product is maintained in a liquid phase, as opposed to prior art batch reactor systems in which chemical B is a solid and is suspended within methanol. In some such embodiments, a weight of the methanol substance 114 added to the first reaction product does not exceed the weight of the first reaction product.

Figure 1B:
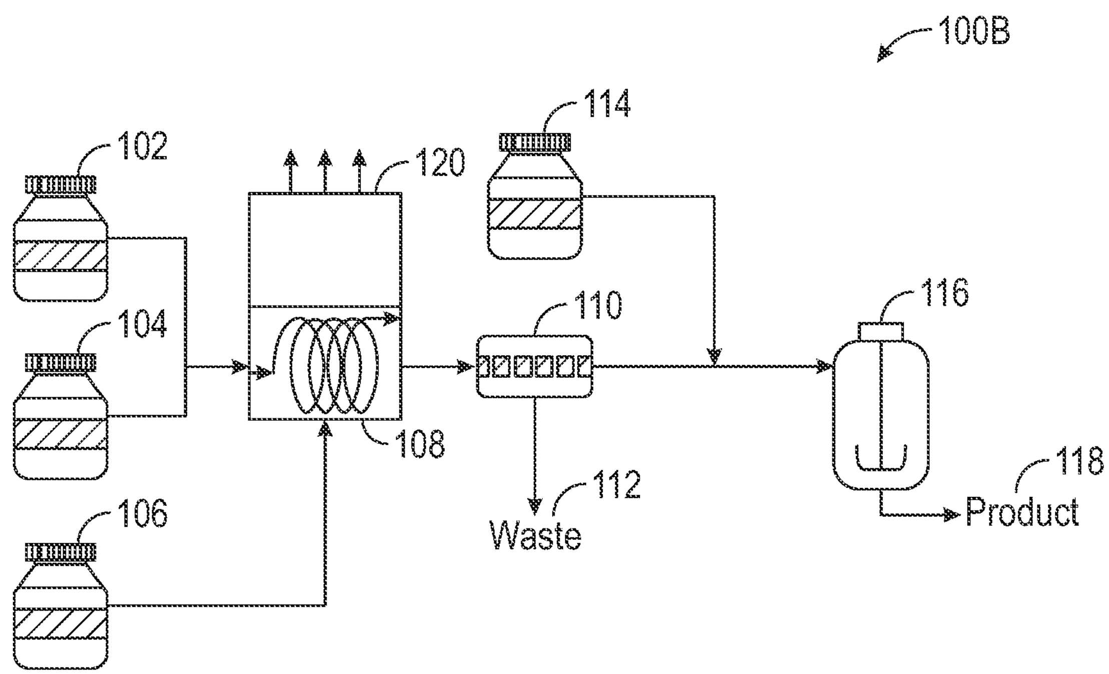
FIG. 1B illustrates another exemplary continuous siloxane synthesis system including a cooling and/or heat recovery system relating to some embodiments.

FIG. 1B illustrates another exemplary continuous siloxane synthesis system 100B including a cooling and/or heat recovery system relating to some embodiments. The exemplary continuous siloxane synthesis system 100B may include similar components, as described above with respect to the continuous siloxane synthesis system 100A, in addition to a cooling unit 120, as shown. In some embodiments, the cooling unit 120 is disposed adjacent to or coupled to the first reactor 108. The cooling unit 120 is configured to remove heat produced within the first reactor 108 from the reaction therewithin. Further, in some embodiments, the first reactor 108 and the cooling unit 120 are integrated into a single unit such as a combination reactor and heat exchanger unit. It should be understood that the continuous flow of the substances within the systems 100A/100B increase the overall heat transfer of the system by way of convection. Accordingly, the continuous flow provides increased contact surface area of chemical substances to wick away heat from the system such that overheating can be prevented and risks of unintentional heating affecting product purity are eliminated. Additionally, in some embodiments, absorbing heat using the cooling unit 120 prevents boiling of the added methanol substance 114. The methanol substance 114 is further prevented from boiling because of the pressurization associated with the continuous flow process such that the methanol substance 114 will have a higher boiling temperature as compared to a non-pressurized batch process. Accordingly, embodiments are contemplated in which the synthesis process is operated safely at a relatively higher temperature without risk of boiling methanol. The relatively higher temperature also improves the overall speed of the synthesis reactions such that a greater amount of product may be produced over a shorter period of time. Therefore, the continuous flow of the present disclosure provides substantial improvements to safety and overall efficiency by reducing overheating and risks associated therewith as compared to existing non-pressurized batch processes in which heat is not naturally wicked away.

Embodiments are contemplated in which the heat removed by the cooling unit 120 is used within a heat recovery system to provide heating or energy to one or more other devices. For example, in some embodiments, heat recovery from the cooling unit 120 may be used to provide energy used to power one or more pumps or other components of the system. In some embodiments, heat recovery may be routed to the second reactor 116 to improve the half-life of the second reaction and reduce the reaction time. For example, a residence time of about 5 minutes may be used for the second reaction at room temperature. However, with added heat via heat recovery from the cooling unit 120 may reduce the residence time for the second reaction to times of under 5 minutes.

Additionally, or alternatively, embodiments are contemplated in which the heat recovery from the cooling unit 120 may be used to provide power and/or heating to one or more external devices not related to the exemplary continuous siloxane synthesis system 1008. For example, heat recovery from the cooling unit 120 may be used to provide heating within another chemical process that uses the heat to facilitate one or more chemical reactions. In some such embodiments, a heat exchange fluid may be circulated through a heat recovery unit or directly through the first reactor 108 to absorb heat from the first reactor 108. Accordingly, the heat exchange fluid may be pumped elsewhere to provide heating to said one or more other devices.

Figure 2:
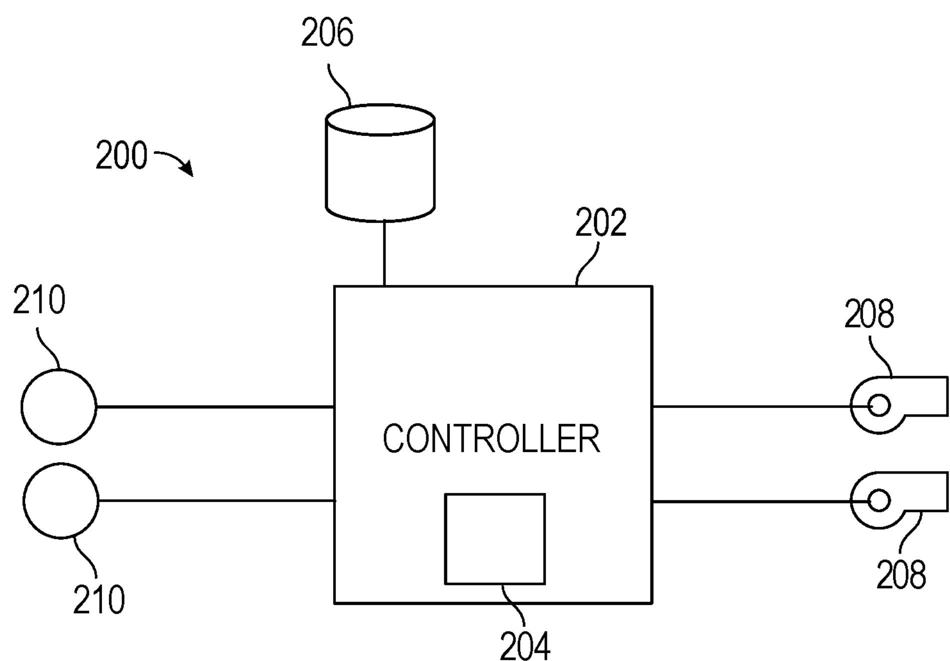
FIG. 2 illustrates an exemplary control system relating to some embodiments.

FIG. 2 illustrates an exemplary control system 200 relating to some embodiments. The control system 200 comprises a controller 202. In some such embodiments, the control system 200 includes at least one processor 204 configured to execute one or more computer-readable instructions. Further, in some embodiments, the controller 202 comprises or is coupled to at least one data storage 206. The data storage 206 may include any form of computer-readable media storage device that stores non-transitory computer-readable media.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

In one example, the at least one data storage 206 stores computer-readable instructions that are executed by the at least one processor 204 of the controller 202. Said computer-readable instructions may be configured to cause the control system 200 to execute a method of siloxane synthesis using the system 100A.

In some embodiments, the controller 202 is communicatively coupled to one or more pumps 208 and/or other flow control devices such as one or more valves. The one or more pumps 208 may be disposed within the exemplary continuous siloxane synthesis system 100A or exemplary continuous siloxane synthesis system 100B to pump one or more fluid substances within the respective system. The controller 202 is configured to instruct operation of the one or more pumps 208 and/or other devices of the system 100A/100B. In some embodiments, during synthesis operation, the one or more pumps 208 are configured to continuously pump fluids through the system 100A/100B.

In some embodiments, the controller 202 is communicatively coupled to one or more sensors 210 such that the controller 202 receives one or more signals from the one or more sensors 210 indicative of measured parameters detected by the one or more sensors 210. The one or more sensors 210 may include any one of or combination of temperature sensors, pressure sensors, flow sensors, phase sensors, and any other suitable form of sensor for detecting one or more parameters of the chemical synthesis system. As such, the one or more sensors 210 are disposed within the flow path of the continuous flow system.

Figure 3:
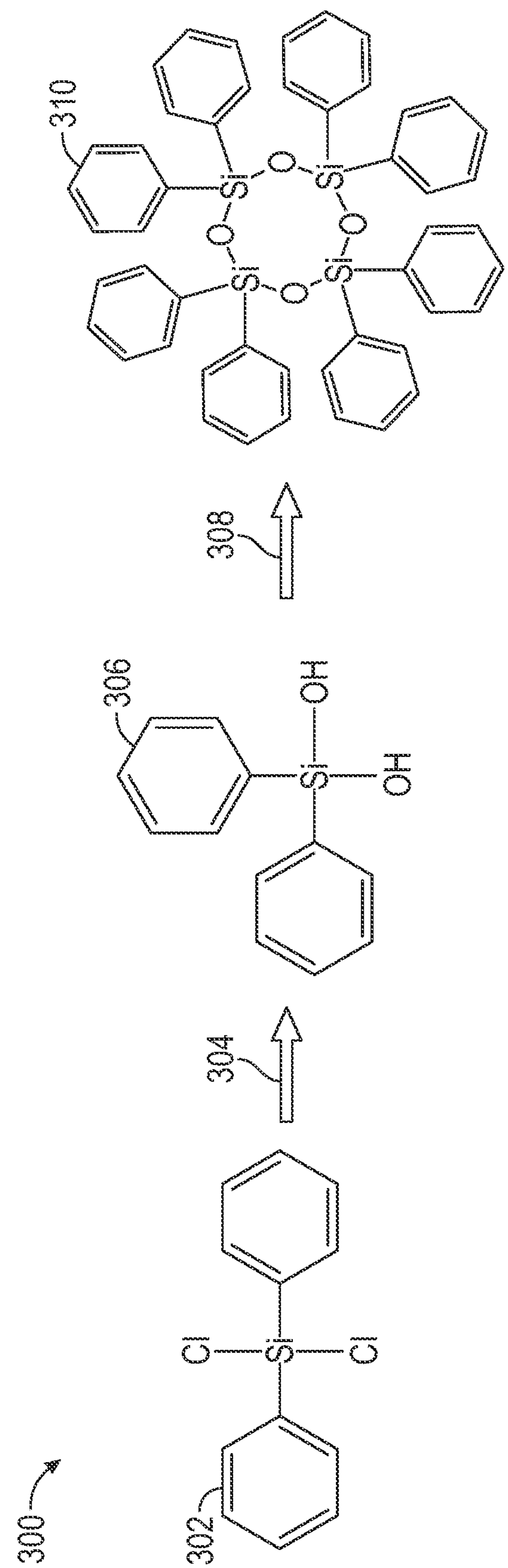
FIG. 3 illustrates an exemplary chemical reaction sequence relating to some embodiments.

FIG. 3 illustrates an exemplary chemical reaction sequence 300 relating to some embodiments. In one exemplary chemical reaction sequence, diphenyldichlorosilane ($Ph_2SiCl_2$) 302 is reacted in a first reaction 304 to form a first reaction product including diphenylsilanediol (DPSD) 306. In some embodiments, the first reaction 304 is conducted within the first reactor 108. As such, the DPSD 306 may be provided into the separator 110 for removal of one or more waste products 112 such as saline waste. It should be understood that the first reaction 304 generates a relatively large amount of heat. Accordingly, heat recovery and/or active or passive cooling techniques may be used to absorb heat produced by the first reaction 304.

The DPSD 306 may then be reacted in a second reaction 308 to form a product including octaphenylcyclotetra siloxane 310. The second reaction 308 may be conducted within the second reactor 116 and the methanol substance 114 may be added upstream or within the second reactor 116 to improve process stability and retain a catalyst within the DPSD 306 solution. In some embodiments, the siloxane 310 is the final product substance of the chemical reaction sequence 300. As such, in some embodiments, the siloxane 310 may be condensed and precipitated out as a solid from a remaining liquid solution received from the second reactor 116. The siloxane 310 may be used as a silicone rubber additive or other silicone material application.

Embodiments are contemplated in which the chemical reaction sequence 300 described above or a similar chemical reaction is carried out continuously within a continuous flow system. Accordingly, one or more pumps may be included to continuously pump one or more fluid substances through the continuous flow system. In some such embodiments, residence times for the above-mentioned reactions may be selected to optimize yield of a given product. Further, in some embodiments, the continuous flow may reduce overall residence times, as compared to a typical batch process, thereby preventing unwanted reactions associated with extended residence times. Accordingly, the overall purity of the final product may be increased by preventing said unwanted reactions from occurring.

It should be understood that, in some embodiments, similar chemical reactions are contemplated for reacting other substances such as other types of siloxanes and non-siloxane substances. For example, embodiments are contemplated for synthesis of hexaphenylcyclotrisiloxane and/or other diphenylcyclic siloxanes.

Figure 4:
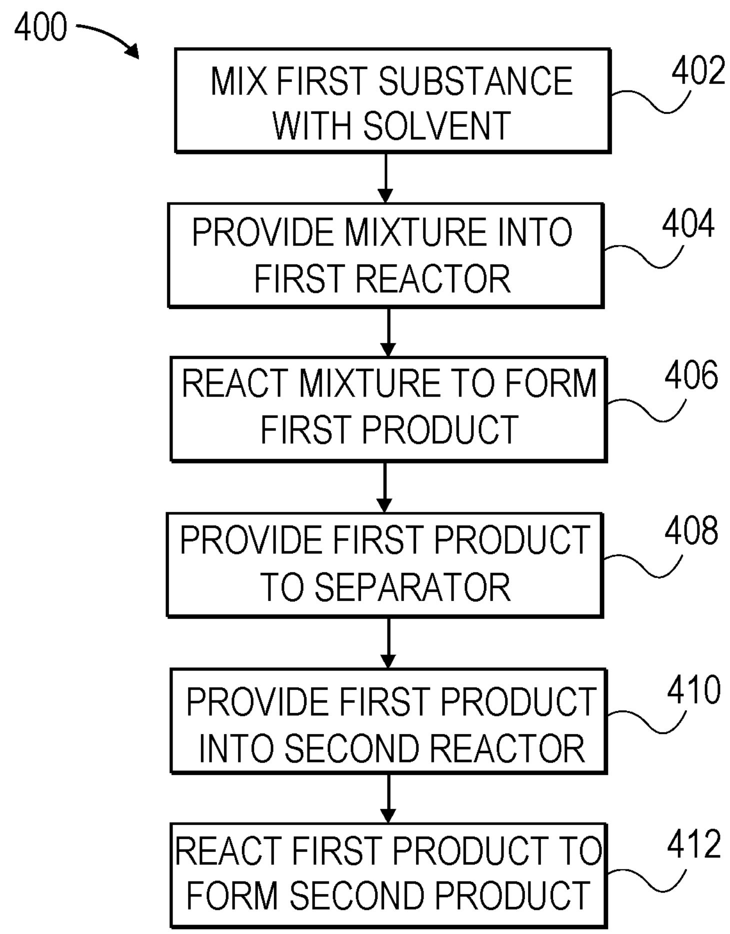
FIG. 4 illustrates an exemplary method of continuous siloxane synthesis relating to some embodiments.

FIG. 4 illustrates an exemplary method 400 of continuous siloxane synthesis relating to some embodiments. In some such embodiments, any portion of the steps described herein are carried out by at least one processor, for example, a processor of the controller 202, as shown, in FIG. 2.

At step 402, a first substance is mixed with a solvent to form a substance- solvent mixture. In some such embodiments, the first substance comprises diphenyldichlorosilane and the solvent comprises a polar aprotic solvent, such as any of acetone, acetonitrile, dichloromethane, dimethylformamide, ethyl acetate, methyl ethyl ketone (MEK), other suitable polar solvents, and combinations thereof. The substance-solvent mixture is provided, at step 404, to the first reactor 108. In some embodiments, the substance-solvent mixture is provided to the first reactor 108 along with an acid scavenger substance to neutralize acidity within the mixture. Further, in some embodiments, the substances provided to the first reactor 108 comprise any combination of an aqueous portion and an oil portion.

At step 406, the substance-solvent mixture is reacted within the first reactor 108 to form a first reaction product. In some embodiments, the first reactor 108 comprises a plug flow reactor to facilitate continuous flow chemical reactions to thereby react the substance solvent mixture and acid scavenger substance. Further, embodiments are contemplated in which excess heat is generated within the first reactor 108. In some such embodiments, a heat recovery system may be integrated into the first reactor 108 to draw heat away from the first reactor 108 to prevent overheating and provide heat and/or energy to one or more other devices.

At step 408, the first reaction product is provided to the separator 110 to separate one or more waste substances from the first reaction product. In some embodiments, the separator 110 comprises a liquid-liquid separator such as a membrane separator configured to separate saline waste from the first reaction product.

At step 410, the first reaction product is provided to the second reactor 116 along with methanol substance 114. The first reaction product is reacted, at step 412, to form a second reaction product. In some embodiments, the second reaction product is a final product of the siloxane synthesis method. Further, it should be understood that the method 400 may be performed continuously such that the one or more of the steps are performed continuously over a certain period of time. In some embodiments, the final product comprises an octaphenylcyclotetrasiloxane or other diphenylcyclic siloxanes including other diphenyl-functionalized cyclic siloxanes. For example, in some embodiments, the final product includes any of hexaphenylcyclotrisiloxane and decaphenylcyclopentasiloxane.

Figure 5:
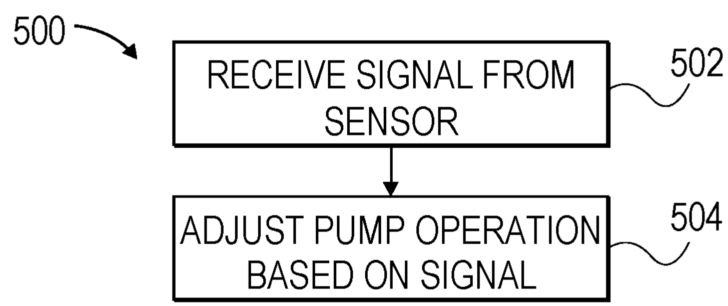
FIG. 5 illustrates an exemplary method of adjusting operation of a siloxane synthesis process relating to some embodiments.

FIG. 5 illustrates an exemplary method 500 of adjusting operation of a siloxane synthesis process relating to some embodiments. In some such embodiments, any portion of the steps described herein are carried out by at least one processor, for example, a processor of the controller 202, as shown, in FIG. 2. Further, in some embodiments, any portion of the steps of method 500 may be carried out in accordance with the method 400. For example, in some embodiments, the method 500 for adjusting operation of the siloxane synthesis process may be performed simultaneously with method 400 such that operation is adjusted while the method 400 of continuous siloxane synthesis is performed.

At step 502, at least one signal is received from one or more sensors of the continuous siloxane synthesis system 100A/100B. For example, the signal may include any one of or combination of measured parameters, such as, a pressure, temperature, flow rate, phase percentage, or other suitable parameter measured within the system.

At step 504, pump operation is adjusted based at least in part on the received signal. For example, a power level of the pumps within the system may be increased based on a determination that the flow rate has fallen below a predetermined threshold. Similar maximum and minimum thresholds are contemplated with respect to pressure, temperature, and other suitable system parameters. Additionally, embodiments are contemplated in which pump operation may be adjusted to an off setting based on detecting one or more parameters outside of a safety threshold.

EXAMPLE

An example relating to an exemplary synthesis process in accordance with the present disclosure will now be described. It is to be understood, however, that this example is provided by way of illustration and should not be taken as limiting upon the overall scope of the invention.

An exemplary synthesis process was demonstrated at lab scale to produce 20 grams of diphenylcyclicsiloxane as a mixture of cyclic trimer and cyclic tetramer within exemplary system 100A. A 10 milliliter microreactor chip was used as a plug flow reactor. The temperature of the system was maintained at 35° C. using a heater/cooler system and a residence time of 2 minutes was used. Flow rates of diphenyldichlorosilane, methyl ethyl ketone (MEK), and sodium hydroxide aqueous solution were set at 0.4, 2.4, and 3.0 milliliters per minute, respectively. Said flow rates, and ratios thereof, may be selected and optimized to prevent precipitation of solids within microchannels of the system. Similarly, the residence time and temperature in the plug flow reactor were set to maintain a flow rate in suitable range for in-line liquid-liquid separation. Alternatively, embodiments are contemplated in which residence time and temperature may be optimized with respect to product volume to produce a maximum amount of product.

A membrane separation system was used to separate an organic phase from a portion of saline waste at an outlet of the first reactor. A membrane was selected with a medium pore size of 900 and was prewetted with hexanes prior to operation to improve separation performance. Methanolic NaOH was added to the separated organic phase at a rate of 0.4 milliliters per minute. The process outlet was collected in a collection flask equipped with a stir bar for condensation of the final product at room temperature. In some embodiments, a stir bar or other device may be used to agitate the product substance at room temperature to facilitate homogenization of the product. Solid precipitate was filtered from the remaining liquid, washed with a mixture of methanol and water, and then dried under vacuum. It should be understood, however, that other temperatures are contemplated for condensing the final product. For example, in some embodiments, elevated temperatures may be selected for condensation to reduce the time needed to condense the final product. Embodiments are contemplated in which the condensation temperature is selected within the range of about 25° C. to about 60° C.

Analysis of the product was completed by Fourier Transform Infrared Spectroscopy (FTIR) and Proton Nuclear Magnetic Resonance (NMR) to confirm removal of silanol. Inductively Coupled Plasma Mass Spectrometry (ICP-MS) of the product determined a residual sodium content of 153 parts per million (ppm). High-Performance Liquid Chromatography (HPLC) was used to determine a total cyclic siloxane purity of 99.42%. A Differential Scanning Calorimetry (DSC) evaluation was run in triplicate to determine second-heat peaks at 187° C. and 200° C., which confirmed the two predominant species of the product as hexaphenylcyclotrisiloxane and octaphenylcyclotetrasiloxane.

It should be understood that the exemplary synthesis process described above is just one example and that the present disclosure contemplates any number of variations to the example process. For example, in some embodiments, the process may be scaled up to produce larger amounts of product. Additionally, any of the parameters and ranges described above may be altered and further optimized, for example, to increase a product yield or adapt the continuous flow system to additional applications. For example, in some embodiments, a temperature within the continuous flow system may be maintained between about 32° C. to about 37° C. using a suitable process heater or other heating device. Similarly, a flowrate of the chlorosilane substance may be selected and maintained between about 0.3 to about 0.5 milliliters per minute during operation.

It should be understood that any portion of the techniques described herein with respect to the exemplary synthesis process may be incorporated into embodiments of the present disclosure. Further, embodiments are contemplated in which any portion of the techniques described with respect to the exemplary synthesis process may be omitted or altered. For example, in one embodiment, the exemplary synthesis process is scaled up to a larger system to increase product yield. Further still, in some embodiments, flow rates may be increased or decreased and the system may be optimized to produce a greater amount of product and/or to produce a product with greater purity. It should be understood that a variety of different flow rates are contemplated. For example, in some embodiments, the continuous synthesis process described herein may be scaled up by increasing the flow rate beyond the milliliter per second range, such as to the liter per second range or another suitable flow rate.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of synthesis of diphenyl cyclic siloxanes within a continuous flow system, the method comprising:
- mixing a chlorosilane substance and a solvent to form a chlorosilane-solvent mixture;
- providing, into a first reactor of the continuous flow system, the chlorosilane-solvent mixture and an acid scavenger substance;
- reacting, in the first reactor of the continuous flow system, the chlorosilane-solvent mixture and an acid scavenger substance to form a first reaction product;
- providing, into a separator, the first reaction product to remove one or more waste products from the first reaction product;
- providing, into a second reactor of the continuous flow system, the first reaction product and a methanol substance; and
- reacting, in the second reactor of the continuous flow system, the first reaction product and the methanol substance to form a diphenyl cyclic siloxane product.

2. The method of claim 1, wherein the methanol substance comprises a caustic methanol.

3. The method of claim 1, wherein the solvent comprises a polar aprotic organic solvent.

4. The method of claim 1, wherein the first reactor comprises a plug flow reactor and the second reactor comprises a continuous stirred tank reactor.

5. The method of claim 1, further comprising:
- receiving a signal from a sensor disposed within a flow path of the continuous flow system, the signal indicative of one or more measured parameters associated with the continuous flow system detected by the sensor; and
- adjusting operation of one or more pumps of the continuous flow system based on the signal from the sensor.

6. The method of claim 1, wherein the chlorosilane substance comprises a diphenyldichlorosilane substance and the diphenyl cyclic siloxane product comprises an octaphenylcyclotetra siloxane substance.

7. The method of claim 6, further comprising:
- maintaining, using at least one heating device, a temperature within the continuous flow system between 32 and 37 degrees Celsius.

8. The method of claim 7, further comprising:
- maintaining, using one or more pumps of the continuous flow system, a flowrate of the chlorosilane substance at between 0.3 and 0.5 milliliters per minute over a period of time.

9. A method of synthesis of diphenyl cyclic siloxanes within a continuous flow system, the method comprising:
- mixing a diphenyldichlorosilane substance and a solvent to form a chlorosilane-solvent mixture;
- providing, into a first reactor of the continuous flow system, the chlorosilane-solvent mixture and an acid scavenger substance;
- reacting, in the first reactor of the continuous flow system, the chlorosilane-solvent mixture and an acid scavenger substance to form a first reaction product;
- providing, into a separator, the first reaction product to remove one or more waste products from the first reaction product;
- providing, into a second reactor of the continuous flow system, the first reaction product and a methanol substance; and
- reacting, in the second reactor of the continuous flow system, the first reaction product and the methanol substance to form an octaphenylcyclotetra siloxane product.

10. The method of claim 9, wherein a flow rate of the diphenyldichlorosilane substance is selected to prevent precipitation of solids within the continuous flow system.

11. The method of claim 9, further comprising:
- condensing the octaphenylcyclotetra siloxane product at room temperature.

12. The method of claim 11, further comprising:
- while the octaphenylcyclotetra siloxane product is condensed at room temperature, agitating the octaphenylcyclotetra siloxane product using a stir bar.

13. The method of claim 11, further comprising:
- after condensing the octaphenylcyclotetra siloxane product, filtering a solid precipitate from a liquid portion of the octaphenylcyclotetra siloxane product; and
- washing the solid precipitate using a methanol water mixture.

14. A method of synthesis of diphenyl cyclic siloxanes within a continuous flow system, the method comprising:
- mixing a chlorosilane substance and a solvent to form a chlorosilane-solvent mixture;
- providing, into a first reactor of the continuous flow system, the chlorosilane-solvent mixture and an acid scavenger substance;
- reacting, in the first reactor of the continuous flow system, the chlorosilane-solvent mixture and an acid scavenger substance to form a first reaction product;
- providing, into a second reactor of the continuous flow system, the first reaction product and a methanol substance;
- receiving, from at least one sensor disposed in the continuous flow system, a signal comprising information indicative a temperature, pressure, and flow rate within the continuous flow system; and reacting, in the second reactor of the continuous flow system, the first reaction product and the methanol substance to form a diphenyl cyclic siloxane product.

15. The method of claim 14, further comprising:

adjusting operation of one or more pumps disposed within the continuous flow system based at least in part on the signal.

16. The method of claim 14, further comprising:

maintaining, using at least one heating device, a temperature within the continuous flow system between 32 and 37 degrees Celsius.

17. The method of claim 14, further comprising:

providing, into a separator, the first reaction product to remove one or more waste products from the first reaction product.

18. The method of claim 17, wherein the separator comprises a membrane separation system configured to separate the one or more waste products.

19. The method of claim 14, further comprising:

after condensing the diphenyl cyclic siloxane product, filtering a solid precipitate from a liquid portion of the diphenyl cyclic siloxane product; and washing the solid precipitate using a methanol water mixture.

20. The method of claim 14, wherein the methanol substance comprises caustic methanol.

* * * * *